United States Patent
Ha et al.

(10) Patent No.: US 9,710,958 B2
(45) Date of Patent: Jul. 18, 2017

(54) IMAGE PROCESSING APPARATUS AND METHOD

(71) Applicant: SAMSUNG ELECTRONICS CO., LTD., Suwon (KR)

(72) Inventors: In Woo Ha, Suwon (KR); Tae Hyun Rhee, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/125,515

(22) PCT Filed: Nov. 29, 2012

(86) PCT No.: PCT/KR2012/010253
§ 371 (c)(1),
(2) Date: Dec. 11, 2013

(87) PCT Pub. No.: WO2013/081398
PCT Pub. Date: Jun. 6, 2013

(65) Prior Publication Data
US 2014/0118353 A1    May 1, 2014

(30) Foreign Application Priority Data

Nov. 29, 2011  (KR) .................. 10-2011-0125728
Nov. 29, 2012  (KR) .................. 10-2012-0137122

(51) Int. Cl.
*G06T 19/00* (2011.01)
*G06T 15/50* (2011.01)
(Continued)

(52) U.S. Cl.
CPC .......... *G06T 15/506* (2013.01); *G06T 19/006* (2013.01); *H04N 13/025* (2013.01);
(Continued)

(58) Field of Classification Search
CPC ..... G06T 19/00; G06T 15/506; G06T 7/0075; G06T 3/4038; G09G 5/14; H04N 13/0239; G01B 11/022; G01B 11/002; G01S 11/12
(Continued)

(56) References Cited

U.S. PATENT DOCUMENTS 6,538,751 B2   3/2003  Ono
7,126,630 B1  10/2006  Lee et al.
(Continued)

FOREIGN PATENT DOCUMENTS

JP    6-119303    4/1994
JP   11-119303    4/1999
(Continued)

OTHER PUBLICATIONS

International Search Report mailed Feb. 15, 2013 in corresponding International Application No. PCT/KR2012/010253.
(Continued)

*Primary Examiner* — Ke Xiao
*Assistant Examiner* — Andrew Shin
(74) *Attorney, Agent, or Firm* — NSIP Law

(57) ABSTRACT

An image processing apparatus may include a light capturing unit to generate light environment information by photographing or capturing a light environment of an object, and an object capturing unit to generate object information by photographing or capturing the object. The image processing apparatus may further include a modeling unit to generate a 3-dimensional (3D) model by reflecting or combining the light environment information and the object information, and a rendering unit to render a resultant image with respect to at least one view using the 3D model.

16 Claims, 9 Drawing Sheets

(51) Int. Cl.
*G06T 7/586* (2017.01)
*H04N 5/247* (2006.01)
*G09G 5/14* (2006.01)
*G01S 11/12* (2006.01)
*H04N 5/225* (2006.01)
*H04N 13/02* (2006.01)

(52) U.S. Cl.
CPC ..... *H04N 13/0239* (2013.01); *H04N 13/0242* (2013.01); *H04N 13/0271* (2013.01); *G06T 2215/16* (2013.01); *H04N 5/2258* (2013.01); *H04N 13/0275* (2013.01)

(58) Field of Classification Search
USPC ....... 345/419, 426, 427, 581, 582, 589, 619, 345/629, 630, 632–634; 382/154, 284; 348/47, 135, 139, 140
See application file for complete search history.

(56) References Cited

U.S. PATENT DOCUMENTS

| | | | |
|---|---|---|---|
| 7,697,028 | B1 | 4/2010 | Johnson |
| 2003/0025788 | A1* | 2/2003 | Beardsley ............. G06T 7/0042 348/43 |
| 2003/0038756 | A1 | 2/2003 | Blume et al. |
| 2003/0038814 | A1 | 2/2003 | Blume |
| 2006/0210146 | A1* | 9/2006 | Gu ................................ 382/154 |
| 2007/0118805 | A1 | 5/2007 | Kraus et al. |
| 2007/0146482 | A1* | 6/2007 | Kiscanin ............ G06K 9/00255 348/148 |
| 2010/0283883 | A1* | 11/2010 | Sato et al. ..................... 348/335 |
| 2011/0164116 | A1 | 7/2011 | Gay et al. |
| 2011/0285825 | A1* | 11/2011 | Tian et al. ...................... 348/47 |
| 2012/0194517 | A1* | 8/2012 | Izadi et al. .................... 345/420 |

FOREIGN PATENT DOCUMENTS

| | | |
|---|---|---|
| JP | 11-265440 | 9/1999 |
| JP | 10-2006-0124877 | 12/2006 |
| JP | 2008-116308 | 5/2008 |
| JP | 2010-166596 | 7/2010 |
| JP | 2010-271675 | 12/2010 |
| JP | 2011-70123 | 4/2011 |
| KR | 10-2001-0024468 | 3/2001 |
| KR | 10-2004-0043280 | 5/2004 |
| KR | 10-2005-0015737 | 2/2005 |
| KR | 10-2006-0015460 | 2/2006 |
| KR | 10-2006-0070174 | 6/2006 |
| KR | 10-2008-0045392 | 5/2008 |

OTHER PUBLICATIONS

J. Unger, A. Wenger, T. Hawkins, A. Gardner and P. Debevec, "*Capturing and Rendering With Incident Light Fields*", Eurographics Symposium on Rendering, 2003.

* cited by examiner

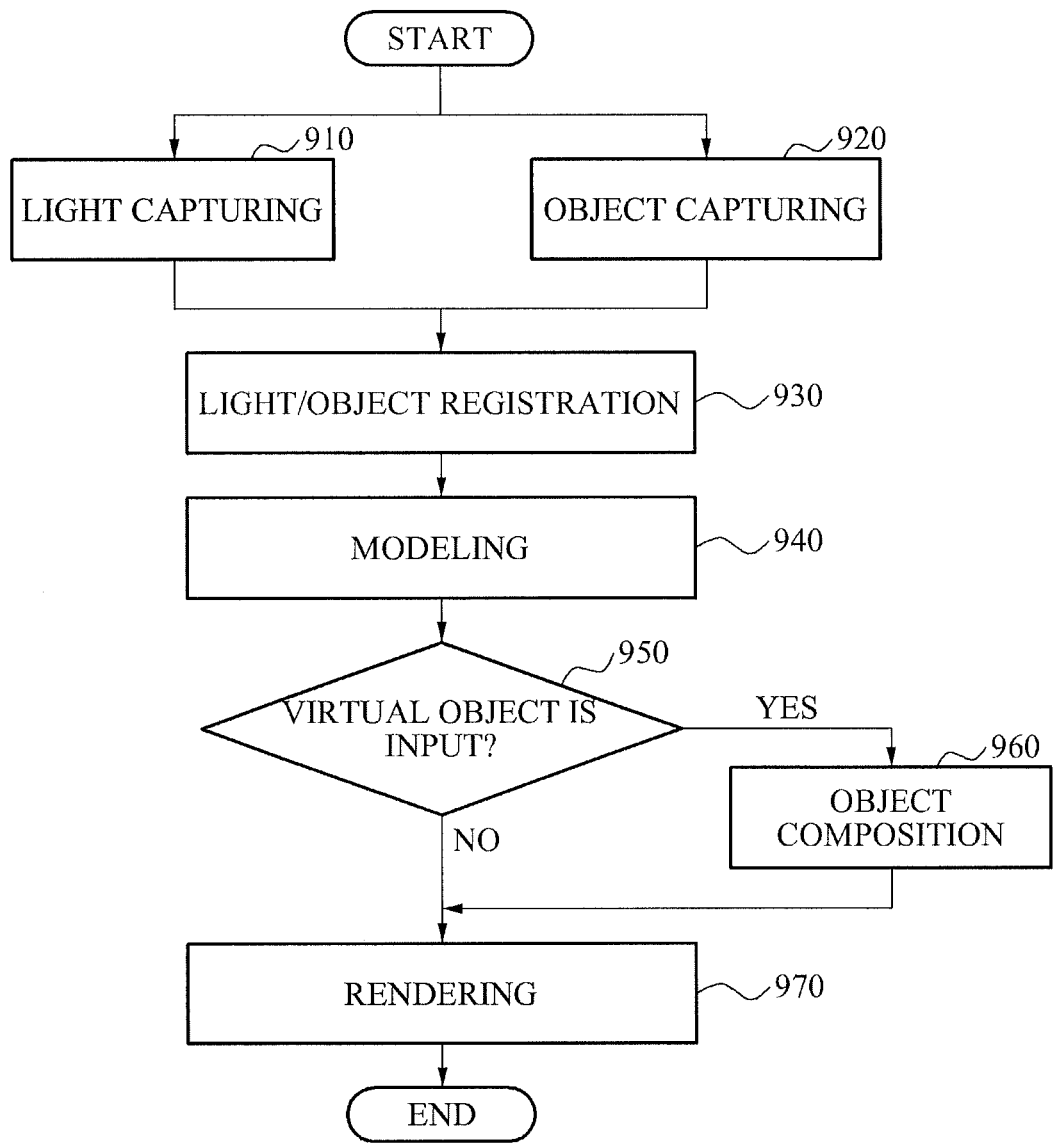

IMAGE PROCESSING APPARATUS AND METHOD

CROSS-REFERENCE TO RELATED APPLICATIONS

This application is a U.S. National Phase application of International Application No. PCT/KR2012/010253, filed on Nov. 29, 2012, which claims the priority benefit of Korean Application Nos. 10-2011-0125728, filed Nov. 29, 2011, and 10-2012-0137122, filed on Nov. 29, 2012, both of which were filed in the Korean Intellectual Property Office, the disclosures of each of which are incorporated herein by reference.

BACKGROUND

1. Field

Example embodiments of the following disclosure relate to an image processing apparatus and method, and more particularly, an image processing apparatus and method which captures a light environment of an object space and uses the light environment for rendering together with an object.

2. Description of the Related Art

Generally, research has been conducted on rendering of a resultant image, performed by generating a 3-dimensional (3D) model with respect to a real scene and including a virtual object in the 3D model.

Application fields of the research include a technology of inserting a virtual synthetic character in a space of an actual photographed scene, thereby maintaining both reality of a real image and a degree of freedom of a computer graphic (CG) image. Such a technology may be referred to as mixed rendering.

Meanwhile, to change a light environment of the actual photographed scene or to achieve rendering without distortion, capturing of the light environment influencing an object in the actual photographed scene is necessary.

Generally, an omni-directional mirror and a mirrored ball are used to obtain information on a position, direction, and intensity of a light source influencing the environment of the object. However, with the use of a dedicated mirrored ball a user is inconvenienced since the dedicated mirrored ball involves additional camera equipment for capturing a light environment.

Accordingly, in view of the foregoing, an improved image processing apparatus and method is needed.

SUMMARY

An aspect of the present disclosure provides an image processing apparatus and method of obtaining accurate light environment information irrespective of types and distances of individual lighting included in a light environment of an object.

Another aspect of the present disclosure provides an image processing apparatus and method increasing user convenience while minimizing information matching between devices, by not requiring an additional camera equipment for capturing the light environment.

Still another aspect of the present disclosure provides an image processing apparatus and method achieving high quality rendering by naturally reflecting a virtual object.

Additional aspects and/or advantages will be set forth in part in the description which follows and, in part, will be apparent from the description, or may be learned by practice of the invention.

According to an aspect of the present disclosure, there is provided an image processing apparatus including a light capturing unit to generate light environment information by photographing a light environment of an object, and an object capturing unit to generate object information by photographing the object.

The image processing apparatus may further include a modeling unit to generate a 3-dimensional (3D) model by reflecting or combining the light environment information and the object information.

The light capturing unit may include at least one cameras to generate the light environment information including a direction of at least one light source included in the light environment and a distance between the at least one light source and the image processing apparatus.

The object capturing unit may include at least two cameras to generate the object information including a distance between the object and the image processing apparatus.

The object capturing unit may include at least one depth camera and at least one color camera to generate the object information including a depth image and a color image of the object.

The light capturing unit may include at least one depth camera and at least one color camera to generate the object information including a depth image and a color image of the light environment.

The image processing apparatus may further include a rendering unit to render a resultant image with respect to at least one view using the 3D model.

The rendering unit may render the resultant image with respect to at least one view by including at least one virtual object in the 3D model.

The light capturing unit may include at least one wide angle lens that increases a field of view (FoV) of the light capturing unit.

According to another aspect of the present disclosure, there is provided an image processing apparatus including a light capturing unit to generate light environment information by photographing a light environment of an object, an object capturing unit to generate a color image and a depth image by photographing the object, and a rendering unit to render at least one virtual object with the object, using the light environment information, the color image, the depth image, and the at least one object information.

According to yet another aspect of the present disclosure, there is provided an image processing method including generating light environment information by photographing a light environment of an object by a light capturing unit of an image processing apparatus, and generating object information by photographing the object by an object capturing unit of the image processing apparatus.

The image processing method may further include generating a 3-dimensional (3D) model related to the object by reflecting or combining the light environment information and the object information by a modeling unit of the image processing apparatus.

The generating of the light environment information may include generating the light environment information including a direction of at least one light source included in the light environment and a distance between the at least one light source and the image processing apparatus, by the light capturing unit including at least two cameras.

The generating of the object information may include generating the object information including a distance between the object and the image processing apparatus, by the object capturing unit including at least two cameras.

The generating of the object information may include generating the object information including a depth image and a color image by photographing the object by at least one depth camera and at least one color camera included in an object capturing unit.

The image processing method may further include rendering a resultant image with respect to at least one view by including at least one virtual object in the 3D model by a rendering unit of the image processing apparatus.

According to still another aspect of the present disclosure, there is provided an image processing method including generating light environment information by photographing a light environment of an object by a light capturing unit of an image processing apparatus, generating a color image and a depth image by photographing the object by an object capturing unit of the image processing apparatus, and rendering at least one virtual object with the object, using the light environment information, the color image, the depth image, and the at least one object information.

According to still another aspect of the present disclosure, there is provided an image processing apparatus, including: a light capturing unit to capture light environment information from an upwards direction; an object capturing unit to capture object information from a front direction; and a rendering unit to render a resultant image with respect to a three-dimensional (3D) model, based on whether a virtual image is input.

According to the embodiments, accurate light environment information may be obtained irrespective of types and distances of individual lighting included in the light environment of an object, and reflected in rendering.

Since an additional camera equipment is unnecessary for capturing the light environment, user convenience may be increased and information matching between devices may be reduced.

Capturing of the light environment may be performed relatively accurately and quickly irrespective of whether the light environment is interior or exterior.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 is a flowchart illustrating an image processing method, according to an example embodiment of the present disclosure.

DETAILED DESCRIPTION

Reference will now be made in detail to embodiments of the present disclosure, examples of which are illustrated in the accompanying drawings.

Figure 1:
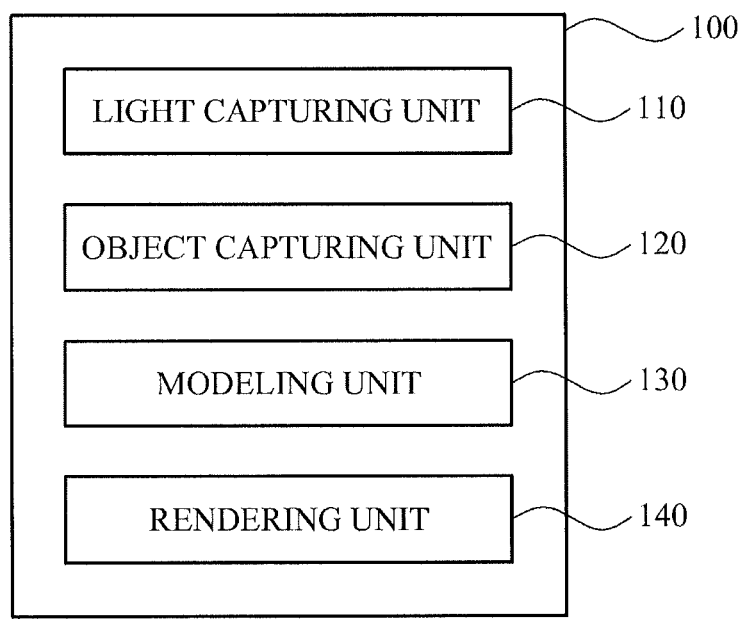
FIG. 1 is a block diagram illustrating an image processing apparatus, according to an example embodiment of the present disclosure.

FIG. 1 is a block diagram illustrating an image processing apparatus 100, according to an example embodiment of the present disclosure.

According to the example embodiment, the image processing apparatus 100 may include a light capturing unit 110 to photograph a light environment of an object space and thereby generate light environment information. Further, the image processing apparatus 100 may further include an object capturing unit 120 implemented by a camera module different from the light capturing unit 110 to photograph objects.

The light environment may include at least one light source that may influence the lighting of the object. The light source may include not only a direct light that emits light by itself but also an indirect light that is reflected light, which is reflected off of a surface, emitted from another place or light source.

Since the image processing apparatus 100 includes both the light capturing unit 110 and the object capturing unit 120, a mirrored ball mentioned above in relation to the conventional art may be omitted. In addition, the light environment (hereinafter, may be referred to merely as 'light') and the object may be captured simultaneously by the light capturing unit 110 and the object capturing unit 120, respectively.

As will be described hereinafter, the light capturing unit 110 and the object capturing unit 120 may be implemented in various embodiments.

For example, the light capturing unit 110 may be implemented by a stereo color camera, an infrared (IR) time of flight (TOF) camera, or a fisheye lens, however, the present disclosure is not limited thereto. Embodiments will be described in further detail with reference to FIGS. 2 to 5.

The term 'light environment information' used herein may be understood as an image including at least one light source, the image which may not be directly shown in a resultant image to be rendered and not influenced by a virtual object to be inserted in the image. The light environment information may be any information that includes light information such as a direction, intensity, and the like, of the at least one light source captured by the light capturing unit 110.

For example, depending on embodiments, the light environment information may refer to a combination of a color image and a depth image. In another embodiment, the light environment information may be understood as a stereo color image providing two color images having different views. Furthermore, the light environment information may be understood directly as information on a position and intensity of lighting calculated using an image, rather than as the image. The above description of the light environment information is exemplary, and thus, the present disclosure is not limited thereto.

In addition, the term 'object information' may be understood as an image directly shown in the resultant image to be rendered and influenced by insertion of a virtual object. Further, the term 'object information' may be understood as geometric information or texture information for generating a 3D model using the image. When the object information refers to the image, various types such as the combination of the color image and the depth image or the stereo color image may be included as aforementioned.

Depending on embodiments, the image processing apparatus 100 may include both the light capturing unit 110 and the object capturing unit 120, with cameras configured to take an image in different directions.

When light environment information and the object information with respect to the object space are generated by the light capturing unit 110 and the object capturing unit 120, respectively, the modeling unit 130 may generate the 3D model corresponding to the object space.

The 3D model may be understood as data that includes the geometric information and the texture information of objects in the object space, however, the present disclosure is not limited thereto. The 3D model may include a position and intensity of lighting. In the 3D model, images seen at predetermined time instances or time frames from a specific point of view are calculated, which is defined as rendering.

The rendering may be performed by the rendering unit 140 which may be included in the image processing apparatus 100.

According to an example embodiment, the rendering unit 140 may perform rendering with an image by combining virtual object information input separately from the 3D model information, so that the image looks as if the virtual object actually existed in the object space.

That is, after a real space is constructed into the 3D model by real photographing, the image is composed as if a character implemented by animation actually existed in the space.

According to example embodiments, it is very complicated to obtain accurate light environment information so as to increase rendering quality. Also, it takes much cost and time. For example, a separate camera and a mirrored ball are necessary. Matching may be also necessary due to inconsistency of a camera view or a photographing view.

However, according to the embodiments, since the light capturing unit 110 and the object capturing unit 120 operate together in the image processing apparatus 100, matching may not be necessary and the light environment may be captured quickly and accurately without additional equipment.

Hereinafter, configurations and operations of the light capturing unit 110 and the object capturing unit 120 will be described in detail with reference to FIG. 2.

Figure 2:
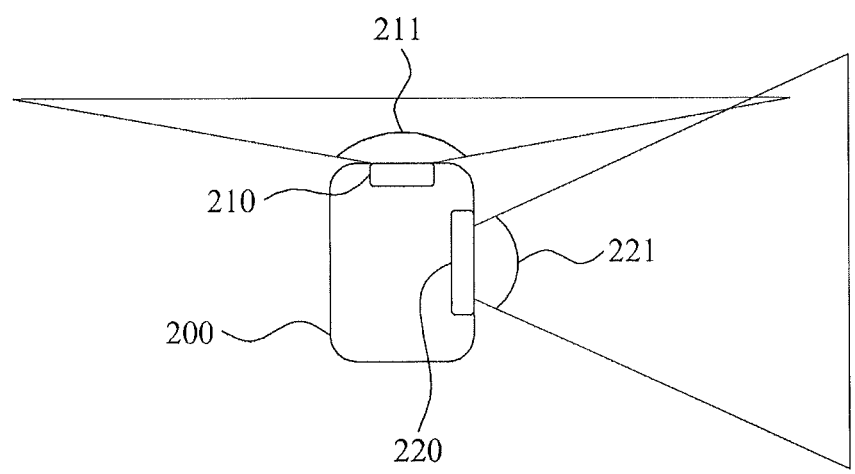
FIG. 2 is a diagram illustrating an operation of an image processing apparatus, according to an example embodiment of the present disclosure.

FIG. 2 is a diagram illustrating an operation of an image processing apparatus 200, according to an example embodiment of the present disclosure.

The image processing apparatus 200 may include a light capturing unit 210 and an object capturing unit 220. Each of the light capturing unit 210 and the object capturing unit 220 may include at least one processing device.

The light capturing unit 210 may photograph a field of view (FoV) 211 and generate light environment information of the FoV 211.

The object capturing unit 220 may photograph objects by photographing an FoV 221. Depending on embodiments, any of a single color image, stereo color images, depth images and color images may result from using the object capturing unit 220, however, the present disclosure is not limited thereto.

As illustrated, the FoV 211 of the light capturing unit 210 may be larger than the FoV 221 of the object capturing unit 220. For example, the light capturing unit 210 may photograph a range including a ceiling. The object capturing unit 220 may photograph an object from a front side of the image processing apparatus 200.

The configuration will be described in further detail with reference to FIG. 3.

Figure 3:
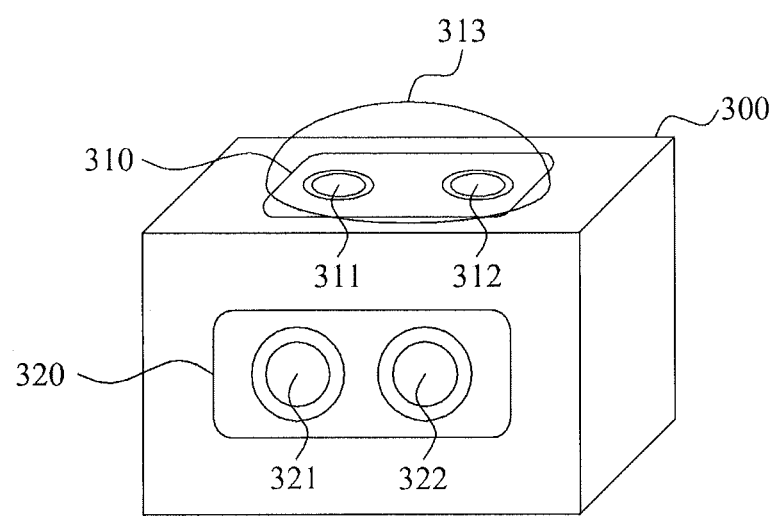
FIG. 3 is a perspective view of illustrating a configuration of an image processing apparatus, according to an example embodiment of the present disclosure.

FIG. 3 is a perspective view illustrating a configuration of an image processing apparatus 300, according to an example embodiment of the present disclosure.

In the present example embodiment, a light capturing unit 310 may include two cameras 311 and 312. The two cameras 311 and 312 may be color camera modules constituting a stereo camera. In another embodiment, the two cameras 311 and 312 may include one color camera and one depth camera. The depth camera may be the Time of Flight (TOF) type, however, the present disclosure is not limited thereto. The two cameras 311 and 312 of the light capturing unit 310 may be disposed horizontally or vertically on the upper surface of the image processing apparatus 300. The present disclosure is not limited thereto, and thus, the two cameras 311 and 312 may be disposed in other arrangements on the upper surface of the image processing apparatus 300.

According to an example embodiment, the light capturing unit 310 may include a wide angle lens 313 to increase an FoV. The light capturing unit 310 including the wide angle lens 313 may be a fisheye lens generally known in the optical field, however, the present disclosure is not limited thereto.

In the present example embodiment, the object capturing unit 320 may also include two cameras 321 and 322. As in the previous embodiment, the two cameras 321 and 322 may include two stereo color cameras or include depth cameras and color cameras. Moreover, the present disclosure is not limited to two cameras in the light capturing unit 310 or the object capturing unit 320. As such, more or less than two cameras may be used. Further, as in the previous embodiment, the cameras may be disposed horizontally, vertically, or in another manner on a front surface of the image processing apparatus 300.

Figure 4:
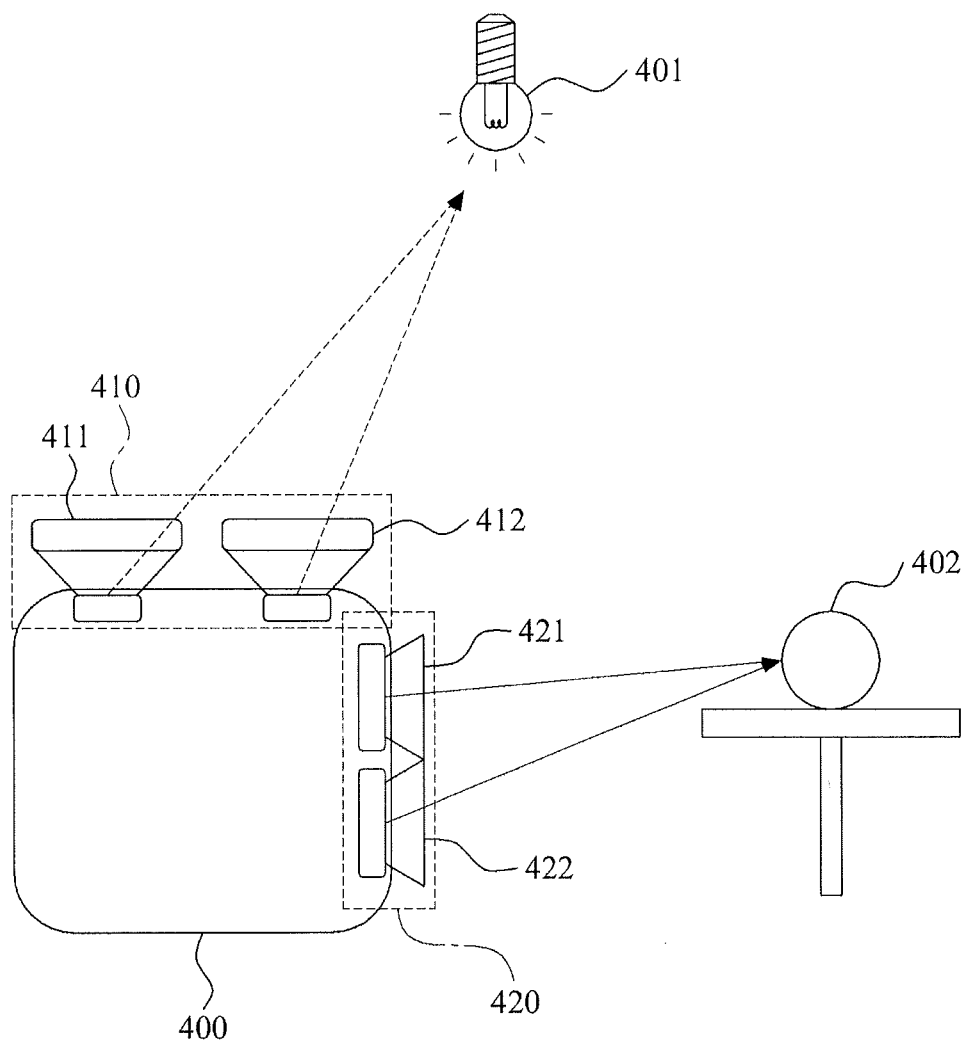
FIG. 4 is a sectional view of illustrating a configuration of an image processing apparatus, according to an example embodiment of the present disclosure.

FIG. 4 is a sectional view illustrating a configuration of an image processing apparatus 400, according to an example embodiment of the present disclosure.

In the same manner as in the embodiment of FIG. 3, a light capturing unit 410 may include a camera 411 and a camera 412, and an object capturing unit 420 may include a camera 421 and a camera 422.

The cameras 411 and 412 of the light capturing unit 410 may photograph a light source 401 constituting a light environment, thereby obtaining information on a direction, a distance, and intensity or luminance of the light source 401. The information described above is only an example, and thus, the present disclosure is not limited thereto. For example, a color of light may be included in the information.

The cameras 421 and 422 of the object capturing unit 420 may obtain a stereo image by photographing an object 402, for example. In another embodiment, a depth image and a color image may be obtained. Based on the images, object information such as geometric information or texture information may be generated, however, the present disclosure is not limited thereto. That is, object information other than geometric information or texture information may be generated.

According to the art, users are inconvenienced since a dedicated mirrored ball is necessary for capturing the light environment information. Also, when a relative position of the light source 401 with respect to a device for capturing the light environment information and a relative position of the light source 401 with respect to the object 402 are different from each other, it is difficult to accurately capture the light environment information. For example, since the light source 401 is presumed to be a distant light such as the sun, capturing light environment information may be limited to exterior natural light.

However, according to the example embodiments of the present disclosure, a difference between the relative position of the light source 401 seen from the light capturing unit 410 and the relative position of the light source 401 seen from the object capturing unit 402 may be problematic. Rather, since the light environment is accurately reflected, the 3D model may be more accurately constructed and rendering with varied light environments may be achieved.

Modeling and rendering will be described in detail with reference to FIGS. 5 to 7.

Figure 5:
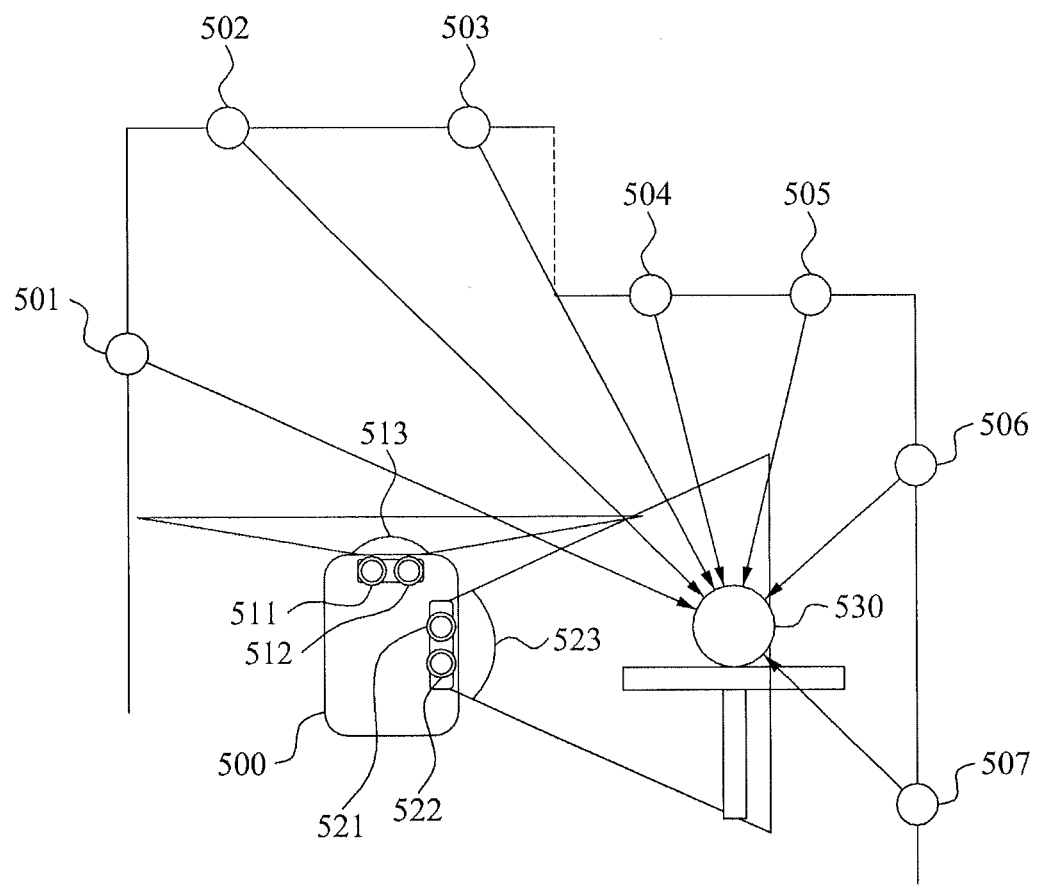
FIG. 5 is a diagram illustrating a process of performing light capturing and object capturing by an image processing apparatus, according to an example embodiment of the present disclosure.

FIG. 5 is a diagram illustrating a process of performing light capturing and object capturing by an image processing apparatus 500, according to an example embodiment of the present disclosure.

The image processing apparatus 500 may include cameras 511 and 512 included in a light capturing unit and cameras 521 and 522 included in an object capturing unit. The light capturing unit and the object capturing unit may capture light environments and objects at FoVs 513 and 523, respectively.

Light sources 501 to 505 may be disposed in the FoV 513 of the light capturing unit. Therefore, the light sources 501 to 505 may be reflected to the light environment when the light environment is captured. Light sources 506 and 507 are outside of the FoV 513 and are not directly visible to the cameras 511 and 512 of the light capturing unit. However, light from light sources 506 and 507 may be reflected to not direct lighting but various indirect lightings and included in the light environment information during capturing of the light environment.

An object 530 may receive light from the light sources 501 to 507. The image processing apparatus 500 may perform rendering by reflecting only part of the light sources of the obtained light environment information or by adding a virtual lighting. Furthermore, rendering may be performed by adding a virtual object instead of using the actual object 530, which will be described in detail with reference to FIG. 6.

Figure 6:
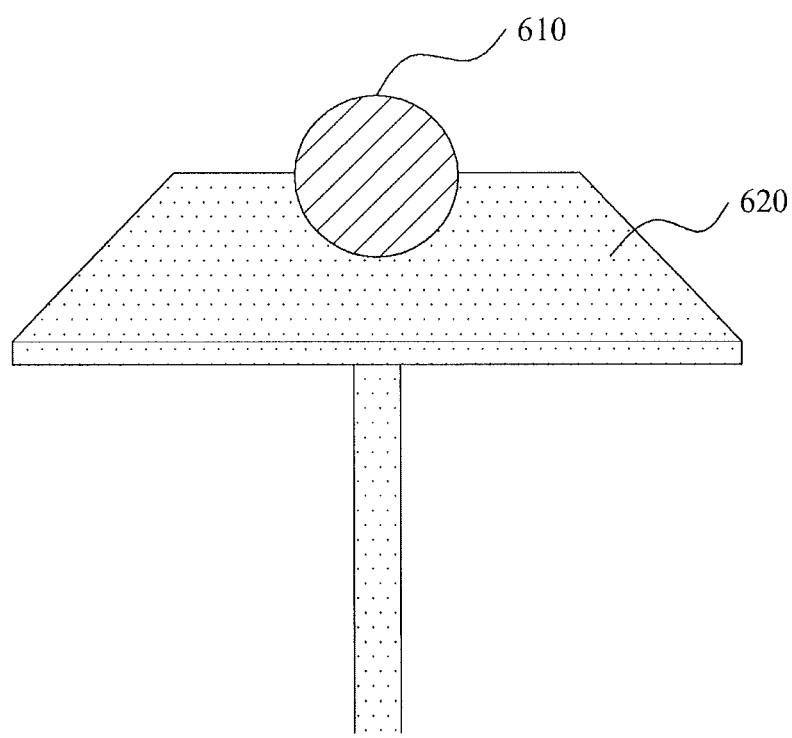
FIG. 6 is a diagram illustrating an object of an example 3-dimensional (3D) model, according to an example embodiment of the present disclosure.

FIG. 6 is a diagram illustrating an example 3D model modeled, according to an example embodiment of the present disclosure.

A 3D model is constructed in which an object 610 is put on a table 620. The 3D model may be constructed by the modeling unit 130 into data by reflecting or combining information obtained by the object capturing unit 120 and the light capturing unit 110. Generally, rendering refers to generation of an image in which objects of a 3D model are seen from a specific point of view.

Figure 7:
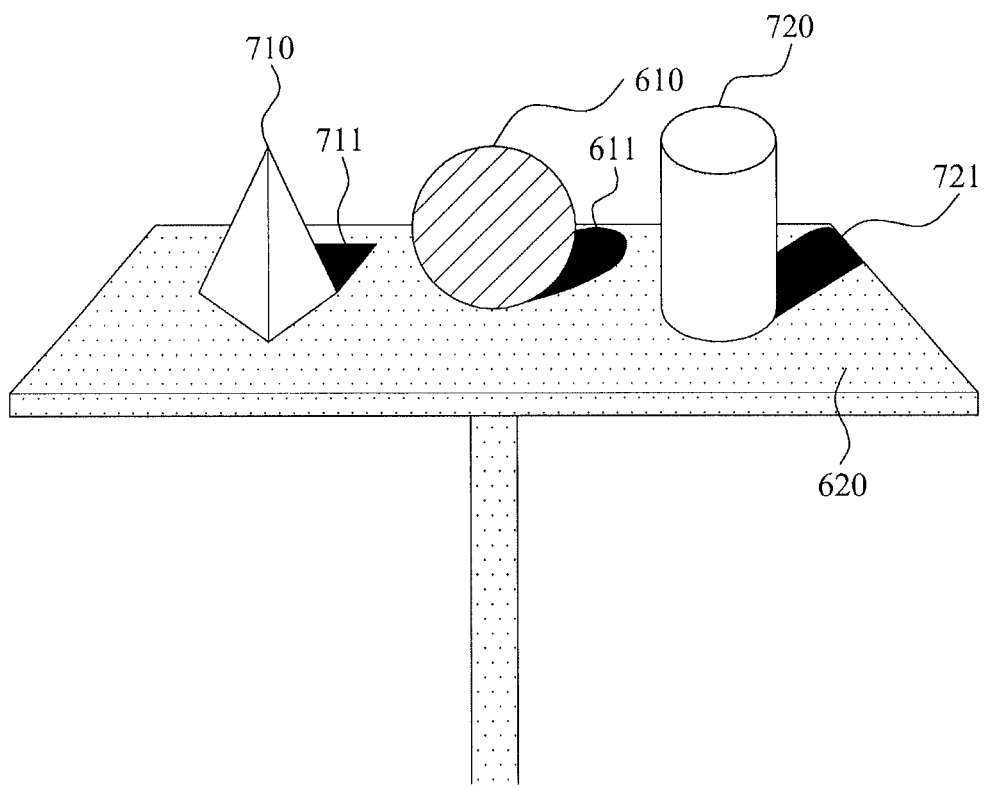
FIG. 7 is a diagram illustrating a result of rendering performed by including a virtual object in the object of FIG. 6.

FIG. 7 is a diagram illustrating a result of rendering performed by including virtual objects 710 and 720 in the object 610 of FIG. 6.

The virtual objects 710 and 720 are included in addition to the real objects 610 and 620 shown in FIG. 6. As a result of rendering performed by reflecting the light environment to the objects or by considering a new light environment, shadows 711, 611, and 721 may be expressed. The shadows 711 and 721 of the virtual objects 710 and 720 are expressed on the real object 620.

Through the foregoing process, creative image rendering with various degrees of freedom (DOF) may be achieved.

Figure 8:
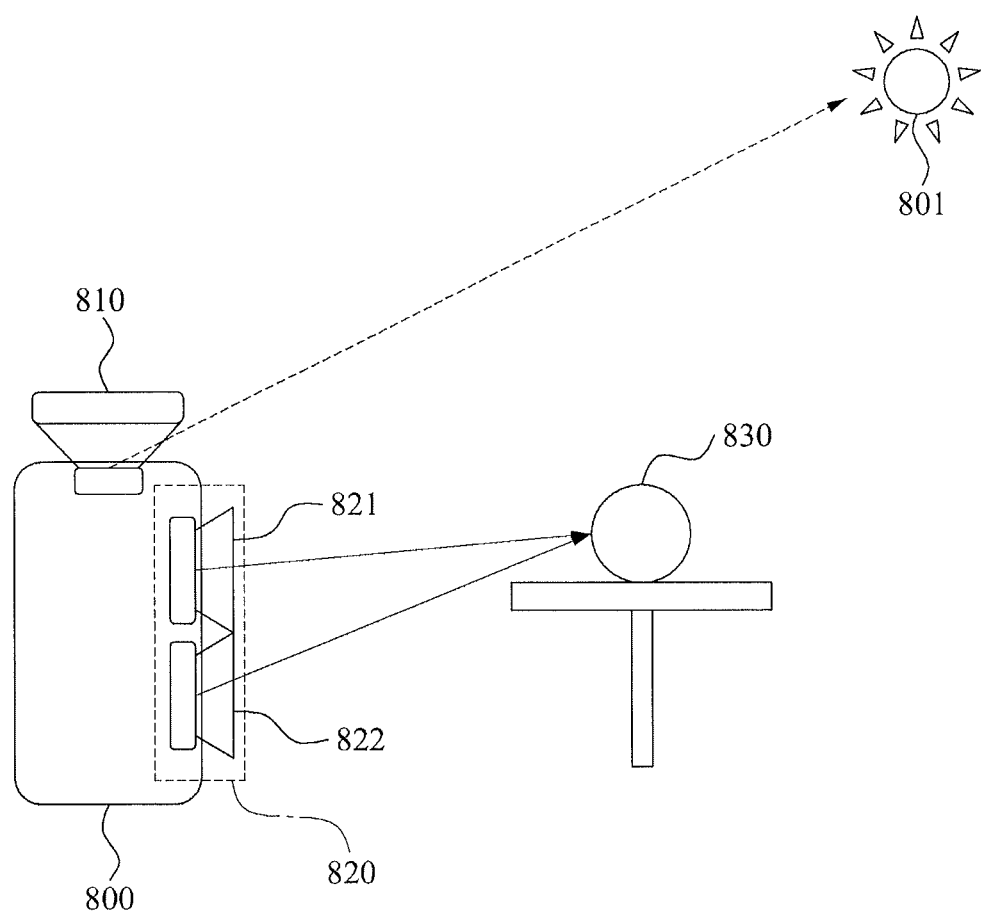
FIG. 8 is a sectional view illustrating a configuration of an image processing apparatus, according to an example embodiment of the present disclosure.

FIG. 8 is a sectional view illustrating a configuration of an image processing apparatus 800, according to an example embodiment of the present disclosure.

In the embodiments shown in FIGS. 3 to 5, positions of the light sources seen from the image processing apparatus and the objects are different because distances to the light sources are relatively short. Conversely, in the present embodiment, when a light source is a distant light such as the sun 801, a light capturing unit 810 may include a single camera.

An object capturing unit 820 may include two cameras 821 and 822, for example, two stereo cameras or a depth camera and a color camera.

A position, direction, and even intensity of the light source 801 seen from the object 830 may be considered to be the same as a position, direction, and intensity of the light source 801 seen from the image processing apparatus 800. Therefore, the configuration of the image processing apparatus 800 may be more simplified.

FIG. 9 is a flowchart illustrating an image processing method, according to an example embodiment of the present disclosure.

In operation 910, the light capturing unit 110 of the image processing apparatus 100 may generate light environment information by photographing the light environment of the object space.

In operation 920, which may be performed parallel or sequentially with operation 910, the object capturing unit 120 of the image processing apparatus 100 may generate object information using at least two stereo cameras or both a depth camera and a color camera. The foregoing process is already described with reference to FIGS. 1 to 5.

Thus, the light environment, that is, light, and the object information may be registered using the information, and 3D modeling may be performed by the modeling unit 130 in operation 940. The 3D model is already described with reference to FIGS. 5 and 6.

In operation 950, when input of a virtual object is determined to be absent, rendering with respect to the 3D model may be directly performed in operation 970. When the virtual object is input, composition is performed by matching the object information with an existing 3D model in operation 960, and rendering may be performed in operation 970.

The foregoing process including the rendering may be performed as described with reference to FIGS. 5 to 7.

According to the various embodiments, since light capturing and object capturing are simultaneously performed, an entire real image environment may be obtained quickly and accurately.

In addition, since a light capturing camera and an object capturing camera are mounted in one body, dedicated matching may be omitted.

Even when rendering is performed by inserting a virtual object in the real image environment, a process of estimating a correct position to place the virtual object and disposing a mirrored ball in the position to capture the light environment may be unnecessary. Capturing with respect to any time and place and rendering may be performed. For example, whether the light environment is interior or exterior may not be an influential factor.

Furthermore, according to the embodiments, the light capturing unit and the object capturing unit may be implemented in various manners using a stereo color camera, an IR TOF camera, a fisheye lens, and the like. That is, application fields relating to the present disclosure may be expanded.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Further, according to an aspect of the embodiments, any combinations of the described features, functions and/or operations can be provided.

Moreover, the various embodiments of the image processing apparatus discussed above may include at least one processor to execute at least one of the above-described units and methods.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. An image processing apparatus, comprising:
a light capturing camera device configured to generate light environment information by capturing a light environment of an object;
an object capturing camera device configured to generate object information by capturing the object;
a processor; and
a modeler implemented by the processor and configured to generate a 3-dimensional (3D) model by combining the light environment information and the object information,
wherein the light environment information comprises a direction of a first light source included in the light environment, a distance between the first light source and the image processing apparatus, and information of indirect lightings of a second light source,
wherein the indirect lightings is reflected light emitted from the second light source,
wherein the object information comprises a depth image of the object, a color image of the object, and a distance between the object and the image processing apparatus,
wherein a field of view of the light capturing device does not overlap with most of a field of view of the object capturing device,
wherein the field of view of the light capturing device is stationary with respect to the field of view of the object capturing device,
wherein the modeler is configured to generate the 3D model by reflecting a part of the light environment information or by adding a virtual lighting,
wherein the processor is configured to:
render, in response to input of a virtual object being determined as absent, with respect to the 3D model, and
composite, in response to the virtual object being input, by matching the object information with an existing 3D model prior to rendering, and
wherein a real space is constructed into the 3D model by real photographing and the virtual object is input separately from the 3D model.

2. The image processing apparatus of claim 1, wherein the object capturing camera device comprises at least two cameras, and is configured to generate the object information comprising at least a distance between the object and the image processing apparatus.

3. The image processing apparatus of claim 1, wherein the object capturing camera device comprises at least one depth camera and at least one color camera, and is configured to generate the object information comprising the depth image of the object and the color image of the object.

4. The image processing apparatus of claim 1, wherein the light capturing camera device comprises at least one depth camera and at least one color camera, and is configured to generate the light environment information comprising a depth image and a color image of the light environment.

5. The image processing apparatus of claim 1, further comprising:
a renderer implemented by the processor and configured to render a resultant image with respect to at least one view using the 3D model.

6. The image processing apparatus of claim 5, wherein the renderer renders the resultant image with respect to at least one view by including at least one virtual object in the 3D model.

7. The image processing apparatus of claim 1, wherein the light capturing camera device comprises at least one wide angle lens that increases a field of view (FoV) of the light capturing camera device.

8. The image processing apparatus of claim 1, wherein the light capturing device is disposed on an upper side of the image processing apparatus, and the object capturing device is disposed on a front side of the image processing apparatus.

9. An image processing apparatus, comprising:
a light capturing camera device configured to generate light environment information by capturing a light environment of an object;
an object capturing camera device configured to generate a color image and a depth image by capturing the object;
a processor;
a modeler implemented by the processor and configured to generate a 3-dimensional (3D) model by combining the light environment information and at least one object information; and
a renderer implemented by the processor and configured to render at least one virtual object with the object, using the light environment information, the color image, the depth image, and the at least one object information,
wherein the light capturing camera device is configured to generate the light environment information comprising a direction of a first light source included in the light environment, a distance between the first light source and the image processing apparatus, and information of indirect lightings of a second light source,
wherein the indirect lightings is reflected light emitted from the second light source,
wherein the object information comprises a depth image of the object, a color image of the object, and a distance between the object and the image processing apparatus,
wherein a field of view of the light capturing device does not overlap with most of a field of view of the object capturing device,
wherein the field of view of the light capturing device is stationary with respect to the field of view of the object capturing device,
wherein the modeler is configured to generate the 3D model by reflecting a part of the light environment information or by adding a virtual lighting,
wherein the processor is configured to:
render, in response to input of a virtual object being determined as absent, with respect to the 3D model, and
composite, in response to the virtual object being input, by matching the object information with an existing 3D model prior to rendering, and
wherein a real space is constructed into the 3D model by real photographing and the virtual object is input separately from the 3D model.

10. An image processing method, comprising:
generating light environment information by capturing a light environment of an object by a light capturing device of an image processing apparatus;
generating object information by capturing the object by an object capturing device of the image processing apparatus;
generating a 3-dimensional (3D) model related to the object by combining the light environment information and the object information by a modeler of the image processing apparatus;
rendering, in response to input of a virtual object being determined as absent, with respect to the 3D model; and
compositing, in response to the virtual object being input, by matching the object information with an existing 3D model prior to rendering,
wherein the light capturing device comprises at least one camera, and is configured to generate the light environment information comprising a direction of a first light source included in the light environment, a distance between the first light source and the image processing apparatus, and information of indirect lightings of a second light source,
wherein the indirect lightings is reflected light emitted from the second light source,
wherein the object information comprises a depth image of the object, a color image of the object, and a distance between the object and the image processing apparatus,
wherein a field of view of the light capturing device does not overlap with most of a field of view of the object capturing device,
wherein the field of view of the light capturing device is stationary with respect to the field of view of the object capturing device,
wherein the generating the 3D model related to the object includes generating the 3D model by reflecting a part of the light environment information or by adding a virtual lighting, and
wherein a real space is constructed into the 3D model by real photographing and the virtual object is input separately from the 3D model.

11. The image processing method of claim 10, wherein:
the generating of the light environment information comprises generating the light environment information comprising a direction of a third light source included in the light environment and a distance between the third light source and the image processing apparatus, determined by the light capturing device; and
the light capturing device comprises at least two cameras.

12. The image processing method of claim 10, wherein:
the generating of the object information comprises generating the object information comprising at least the distance between the object and the image processing apparatus, determined by the object capturing device; and
the object capturing device comprises at least two cameras.

13. The image processing method of claim 10, wherein the generating of the object information comprises generating the object information comprising at least a depth image and a color image by capturing the object by at least one depth camera and at least one color camera comprised in the object capturing device.

14. The image processing method of claim 10, further comprising: rendering a resultant image with respect to at least one view by including at least one virtual object in the 3D model by a renderer of the image processing apparatus.

15. A non-transitory computer readable recording medium storing a program to implement the image processing method of claim 10.

16. An image processing method, comprising:
generating light environment information by capturing a light environment of an object by a light capturing device of an image processing apparatus;
generating a color image and a depth image by capturing the object by an object capturing device of the image processing apparatus;
rendering at least one virtual object with the object, using the light environment information, the color image, the depth image, and at least one object information;
rendering, in response to input of the at least one virtual object being determined as absent, with respect to a 3D model; and
compositing, in response to the at least one virtual object being input, by matching the at least one object information with an existing 3D model prior to rendering,
wherein the light capturing device comprises at least one camera, and is configured to generate the light environment information comprising a direction of a first light source included in the light environment, a distance between the first light source and the image processing apparatus, and information of indirect lightings of a second light source,
wherein the object information comprises the depth image of the object, the color image of the object, and a distance between the object and the image processing apparatus,
wherein the field of view of the light capturing device is stationary with respect to the field of view of the object capturing device, wherein a field of view of the light capturing device does not overlap with most of a field of view of the object capturing device, and wherein a real space is constructed into the 3D model by real photographing and the virtual object is input separately from the 3D model.

* * * * *